May 16, 1933.  A. O. JAEGER  1,909,358
CATALYTIC APPARATUS
Filed June 1, 1931
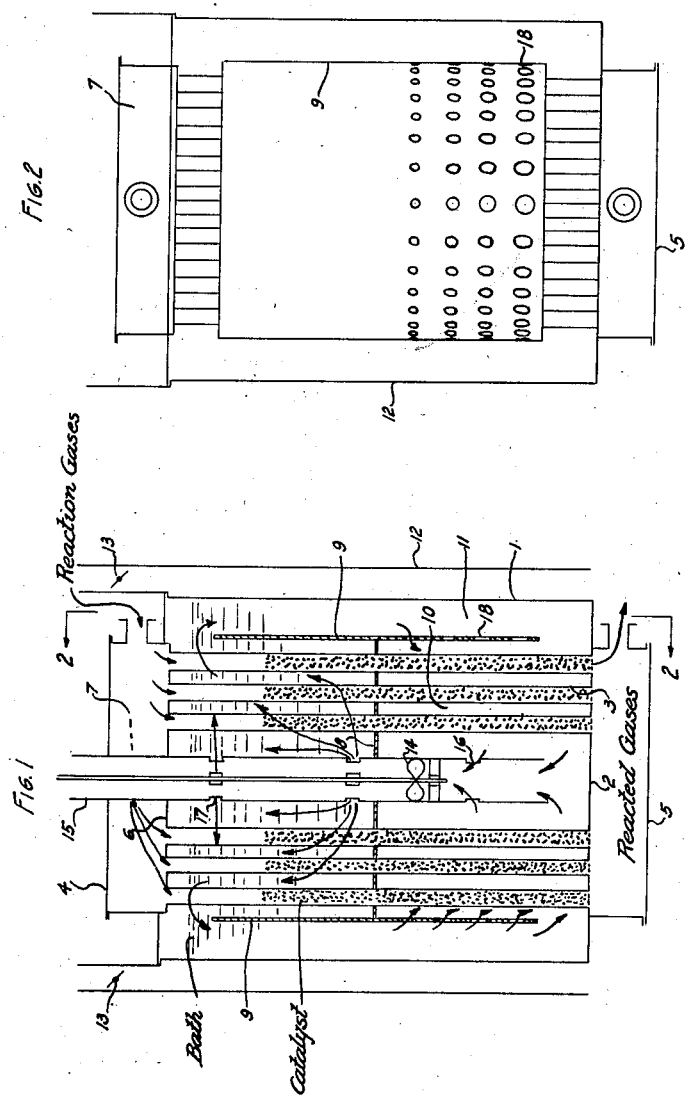
INVENTOR
ALPHONS O. JAEGER
BY Robert Ames Norton
ATTORNEY Patented May 16, 1933

1,909,358

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

CATALYTIC APPARATUS

Application filed June 1, 1931. Serial No. 541,487.

This invention relates to apparatus for carrying out vapor phase catalytic reactions and more particularly to such apparatus in which the reaction temperature is controlled by means of a circulating bath.

In my prior application Serial No. 425,831, filed February 4, 1930, catalytic apparatus has been described in which the catalyst is retained in vertical tubes surrounded by a bath which is made to travel upwardly along the tubes and downwardly through cooling zones, the path of the bath liquid being controlled by vertical and horizontal baffles. In some of the specific modifications shown in that application, the course of the flow has been determined exactly by means of a combined vertical and horizontal baffle structure which causes the liquid to travel upwardly through a plurality of catalyst zones, downwardly through a plurality of cooling zones, and finally to pass down along the converter shell and beneath a horizontal baffle into a central well. This type of converter is eminently suited for reactions the temperature of which must be closely regulated during their entire course, but an intricate baffle structure is required. It is an object of the present invention to obtain a close control of the course of the reaction and to insure an efficient operation of the entire length of the catalyst tubes by means of certain improvements upon the less complicated baffle structures shown in that application, the details of such improvements being illustrated in the accompanying drawing in which:

Fig. 1 is a vertical section through a converter embodying the improved structure of the present invention; and Fig. 2 is an elevation of the converter taken in a plane perpendicular to that of Fig. 1, the air jacket and converter shell having been removed along the line of 2—2 of Fig. 1 to show the perforated baffle structure.

The apparatus of the present invention is suitable for any of the reaction outlined in the prior application above referred to, but is particularly suitable for such strongly exothermic reaction as the oxidation of naphthalene to phthalic anhydride, benzene to maleic acid, anthracene to anthraquinone and the catalytic purification of crude anthracene, crude phenanthrene and other crude aromatic hydrocarbons by the selective combustion of impurities. The operation of the apparatus will be described in conjunction with the oxidation of naphthalene to phthalic anhydride, but it is to be understood that this is by way of illustration only and that the apparatus is suitable for exothermic catalytic reactions generally.

Referring now to the drawings, in which like reference numerals designate similar parts, the converter structure consists, as isusual, of an outer shell 1, a lower tube sheet 2, catalyst tubes 3 and top and bottom pieces 4 and 5. The catalyst tubes may extend upwardly to an upper tube sheet 6, which is mounted in the upper portion of the converter shell 1, or alternatively the tubes may be mounted in a header which is a part of the inlet chamber 7, which may be flexibly connected to the converter shell to allow for expansion and contraction of the tubes in response to variations in temperature. The outer shell 1 and the lower tube sheet 2 define a bath space 10 within which is placed bath material which may be solid or liquid at ordinary temperatures but which boils above, and preferably far above the temperature of the reaction, such substances as lead, mercury-lead alloys or a eutectic mixture of potassium nitrate and potassium nitrite being well suited for this purpose. In order to direct and control the flow of the bath, horizontal and vertical baffles 8 and 9 are mounted within the closure 10, the horizontal baffle extending across the catalyst tubes, preferably at their central portion, and fitting there-around sufficiently tightly to prevent longitudinal travel of the bath liquid along the tubes. The vertical baffle 9, which may be circular or of any other desired shape conforming to the shape of the converter, is mounted around the catalyst tubes 3 in order to define with the converter shell 1 a cooling zone 11, in which the bath liquid is cooled by heat exchange with a gaseous medium passing over the outside of the converter shell or through suitable heat exchange elements, such as double countercurrent heat exchange tubes, inserted within the cooling zones. Other cooling elements may also be employed in these zones as is known in the art, such as liquids which boil at or below the temperature of reaction or non-boiling liquids which are passed through elements retained in this zone. In the present drawing, the illustration has been limited to the use of a jacket 12 and dampers 13 to guide and control the flow of a gaseous medium over the outside of the converter shell 1, but it will be understood that this feature is for purposes of illustration only and that other cooling means may be employed for this purpose if desired.

The heat of reaction given off from the catalyst tubes 3 is taken up by the bath and given off as sensible heat in the cooling zone 11, and in order to insure a suitable travel of the bath liquid a propeller or other impelling means 14 is provided. This propeller operates within a closed central shaft 15, provided with intake and outlet openings 16 and 17 for the bath liquid. The flow of the bath is thus positively maintained and controlled at a predetermined rate, which by suitable regulation of the extent and temperature of the cooling media in heat exchanging relation with the cooling zone 11 insures a proper regulation of the temperature of the bath liquid and if desired a suitable temperature gradient between the upper and lower portions of the catalyst tubes.

In the operation of converters having the structure above described, it has been found that the combination of horizontal and vertical baffles tends to form a dead space beneath the horizontal baffle 8 when the entire amount of the bath liquid is caused to travel the full length of the cooling zone 11, while the flow of the whole stream of fully cooled liquid under the edge of the baffle 9 and across the lower ends of the tubes tends to cause overcooling in this zone and may even extinguish the reaction. This practice, which was considered necessary in order to obtain the full effect of the cooling zone, has resulted in a loss of control of the catalyst temperature in the middle portions of the catalyst tubes for the bath liquid in this portion, being unable to rise by reason of the horizontal baffle 8, has tended to collect without circulation, while the overcooling of the lower ends of the tubes has resulted in lower yields. In order to overcome this difficulty, the present invention provides a series of graduated openings 18 in the lower portion of the vertical baffle 9, thus admitting a sufficient amount of cooled bath liquid from the cooling zone 11 to maintain a flow of the bath liquid over the catalyst tubes at all times. By suitable proportioning of the size of these holes, or by the provision of suitable orifices to regulate the entry of bath liquid, this flow is maintained without undue sacrifice of cooling in the lower portions of the cooling zone 11, it being noted that in the normal operation of the converter the cooling in this portion is much less than that in the upper portions by reason of the smaller heat head between the partially cooled bath liquid and the cooling means. The passage of a suitable portion of the bath liquid through the graduated openings also reduces the flow across the lower ends of the tubes, and since the liquid introduced above has been subjected to a less extended cooling action a more uniform temperature gradient is obtained.

In the case of reactions which do not give off such large amounts of heat as does the catalytic oxidation of naphthalene, the holes may be so designed as to admit a major portion of the flow of the bath liquid, while with the more strongly exothermic reactions the holes will be made relatively smaller and will admit only sufficient liquid to maintain a suitable current across the catalyst tubes in this part. In all events, however, the increasing size of the holes as the bath liquid travels downward insures a maximum flow of the liquid through the cooling zone 11, thus obtaining as long a cooling effect of the major portion of the bath liquid as is desired.

In operation a phthalic anhydride catalyst is filled into the catalyst tubes and a suitable mixture of naphthalene vapors and air is passed into the upper chamber 7 and downwardly through the catalyst in the tubes, the reacted gases leaving through the lower outlet. The propeller 14 is operated to produce a suitably regulated circulation of the bath liquid, which passes over the top of the vertical baffle 9 and down through the cooling zone 11, a portion passing through the holes 18 and the remainder passing under the lower edge of the baffle and back to the central well 15. The size and number of the graduated openings 18 are predetermined in accordance with the amount of bath liquid and the rate of recirculation to produce a length of travel in the cooling zone 11 which will effectively remove the heat given off by the reaction but will not produce overcooling in the lower portions of the catalyst tubes 3. As will be readily understood, such an overcooling would result in a loss of reaction in the portions of the tubes subjected to this excessive cooling, and consequently the application of the present invention results in improved yields and greater ease of operation in any converter of the type to which it is applied.

What is claimed as new is:

1. A catalytic converter for carrying out catalytic vapor phase reactions comprising in combination a substantially vertical converter shell, substantially vertical catalyst containing compartments therein, a liquid bath medium in said converter surrounding the catalyst compartments, and a vertical baffle surrounding the catalyst compartments, extending from a point below the upper surface of the bath to a point above the bottom and forming with the converter shell a cooling zone, said vertical baffle being provided with perforations in its lower portion.

2. A catalytic converter for carrying out catalytic vapor phase reactions comprising in combination a substantially vertical converter shell, substantially vertical catalyst containing compartments therein, a liquid bath medium in said converter surrounding the catalyst compartments, and a vertical baffle surrounding the catalyst compartments, extending from a point below the upper surface of the bath to a point above the bottom and forming with the converter shell a cooling zone, said vertical baffle being provided with a series of perforations in its lower portion, the perforations increasing in size toward the lower edge.

3. A catalytic converter for carrying out catalytic vapor phase reactions comprising in combination a substantially vertical converter shell, substantially vertical catalyst containing compartments therein, a liquid bath medium in said converter surrounding the catalyst compartments, at least one substantially horizontal baffle fitting around the catalyst compartments in the central portion of the converter, said baffle being provided with at least one central opening, and a vertical baffle surrounding the catalyst compartments, extending from a point below the upper surface of the bath to a point above the bottom, and forming with the converter shell a cooling zone, said vertical baffle being provided with perforations in its lower portion.

4. A catalytic converter for carrying out catalytic vapor phase reactions comprising in combination a substantially vertical converter shell, substantially vertical catalyst containing compartments therein, a liquid bath medium in said converter surrounding the catalyst compartments, at least one substantially horizontal baffle fitting around the catalyst compartments in the central portion of the converter, said baffle being provided with at least one central opening, and a vertical baffle surrounding the catalyst compartments, extending from a point below the upper surface of the bath to a point above the bottom and forming with the converter shell a cooling zone, said vertical baffle being provided with a series of perforations in its lower portion, the perforations increasing in size towards the lower edge.

5. A catalytic converter for carrying out catalytic vapor phase reactions comprising in combination a substantially vertical converter shell, substantially vertical catalyst containing compartments therein, a liquid bath medium in said converter surrounding the catalyst compartments and at least one substantially horizontal baffle fitting around the catalyst compartments in the central portion of the converter, said baffle being provided with at least one central opening within which is fitted a tube to form therewith a central well, impelling means in said central tube, and a vertical baffle attached to said horizontal baffle, extending from a point below the upper surface of the bath to a point above the bottom and fitting around said catalyst compartments in order to form with the converter shell a cooling zone, said vertical baffle being provided with perforations in its lower portions.

6. A catalytic converter for carrying out catalytic vapor phase reactions comprising in combination a substantially vertical converter shell, substantially vertical catalyst containing compartments therein, a liquid bath medium in said converter surrounding the catalyst compartments and at least one substantially horizontal baffle fitting around the catalyst compartments in the central portion of the converter, said baffle being provided with at least one central opening within which is fitted a tube to form therewith a central well, impelling means in said central tube, a vertical baffle attached to said horizontal baffle, extending from a point below the upper surface of the bath to a point above the bottom and fitting around said catalyst compartments in order to form with the converter shell a cooling zone, said vertical baffle being provided with a series of perforations in its lower portion, the perforations increasing in size towards the lower edge.

Signed at Pittsburgh, Pennsylvania this 29th day of May 1931.

ALPHONS O. JAEGER.